(12) United States Patent
Mei et al.

(10) Patent No.: US 12,092,929 B2
(45) Date of Patent: Sep. 17, 2024

(54) ARRAY SUBSTRATE AND LIQUID CRYSTAL DISPLAY PANEL

(71) Applicant: Shenzhen China Star Optoelectronics Semiconductor Display Technology Co., Ltd., Guangdong (CN)

(72) Inventors: Xuedong Mei, Guangdong (CN); Bangyin Peng, Guangdong (CN); Ilgon Kim, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 1076 days.

(21) Appl. No.: 16/963,871

(22) PCT Filed: Jun. 4, 2020

(86) PCT No.: PCT/CN2020/094430
§ 371 (c)(1),
(2) Date: Jul. 22, 2020

(87) PCT Pub. No.: WO2021/227157
PCT Pub. Date: Nov. 18, 2021

(65) Prior Publication Data
US 2023/0176429 A1 Jun. 8, 2023

(30) Foreign Application Priority Data

May 13, 2020 (CN) .......................... 202010403206.4

(51) Int. Cl.
*G02F 1/1343* (2006.01)

(52) U.S. Cl.
CPC .............................. *G02F 1/134336* (2013.01)

(58) Field of Classification Search
None
See application file for complete search history.

(56) References Cited

U.S. PATENT DOCUMENTS

| 2004/0004690 | A1 | 1/2004 | Yamaguchi et al. |
| 2011/0141420 | A1 | 6/2011 | Chen et al. |
| 2012/0249940 | A1 | 10/2012 | Choi et al. |
| 2013/0300991 | A1* | 11/2013 | Lim ................... G02F 1/13624 349/123 |
| 2017/0017127 | A1 | 1/2017 | Gan |
| 2017/0059946 | A1 | 3/2017 | Lin et al. |

(Continued)

FOREIGN PATENT DOCUMENTS

| CN | 104808401 | 7/2015 |
| CN | 105242461 | 1/2016 |

(Continued)

*Primary Examiner* — Thanh Nhan P Nguyen (57) ABSTRACT

An array substrate and a liquid crystal display panel are provided. The array substrate includes at least one first pixel. In the first pixel electrodes to which the first pixels correspond, an included angle formed between at least one branch electrode and a first trunk portion is not equal to included angles formed between the other branch electrodes and the first trunk portion. The array substrate of the present disclosure alleviates the problem of narrow viewing angles of the liquid crystal display panel by brightness complementation of the pixel electrodes at different viewing angles.

2 Claims, 9 Drawing Sheets

(56) References Cited

U.S. PATENT DOCUMENTS

| | | | | |
|---|---|---|---|---|
| 2017/0235194 A1* | 8/2017 | Shin | .................... | G02F 1/13439 |
| | | | | 349/139 |
| 2017/0235195 A1* | 8/2017 | Song | ................ | G02F 1/133707 |
| | | | | 349/43 |
| 2018/0157128 A1* | 6/2018 | Yao | .................... | G02F 1/134309 |
| 2019/0139987 A1 | 5/2019 | Gan | | |
| 2019/0162990 A1* | 5/2019 | Nishimura | .............. | G02F 1/167 |
| 2019/0384131 A1 | 12/2019 | Liu | | |

FOREIGN PATENT DOCUMENTS

| | | |
|---|---|---|
| CN | 105842938 | 8/2016 |
| CN | 106647056 | 5/2017 |
| CN | 107589602 | 1/2018 |
| CN | 107942589 | 4/2018 |
| CN | 108345151 | 7/2018 |
| CN | 108415196 | 8/2018 |
| CN | 110174787 | 8/2019 |
| CN | 110346987 | 10/2019 |
| CN | 110908195 | 3/2020 |

\* cited by examiner

ARRAY SUBSTRATE AND LIQUID CRYSTAL DISPLAY PANEL

RELATED APPLICATIONS

This application is a National Phase of PCT Patent Application No. PCT/CN2020/094430 having International filing date of Jun. 4, 2020, which claims the benefit of priority of Chinese Patent Application No. 202010403206.4 filed on May 13, 2020. The contents of the above applications are all incorporated by reference as if fully set forth herein in their entirety.

FIELD AND BACKGROUND OF THE INVENTION

The present disclosure relates to the field of display technologies, and more particularly, to an array substrate and a liquid crystal display panel.

At present, due to a small pixel size of an 8K liquid crystal display panel, pixel electrodes usually adopt a 4-domain design in order to improve transmittance of pixels. However, the pixel electrodes of the 4-domain structure have a problem of narrow viewing angles, which seriously affects the image quality of the 8K liquid crystal display panel.

Therefore, a conventional liquid crystal display panel has a technical problem of narrow viewing angles and needs to be improved.

Technical Problems

Embodiments of the present disclosure provide an array substrate and a liquid crystal display panel to alleviate the technical problem of narrow viewing angles of the conventional liquid crystal display panel.

SUMMARY OF THE INVENTION

Technical Solutions

In order to solve the above problems, the technical solutions provided in the disclosure are as follows:

The present disclosure provides an array substrate, including: a plurality of pixels arranged in an array, each pixel including at least three sub-pixels with different emission colors, pixel electrodes to which the sub-pixels correspond including trunk portions and branch portions, the trunk portions including a first trunk portion and a second trunk portion being perpendicular to each other, the first trunk portion and the second trunk portion dividing each of the pixel electrodes into four display domains, the branch portions including a plurality of branch electrodes arranged at intervals within each of the display domains, one end of each of the branch electrodes being diagonally connected to the trunk portions, the other end of each of the branch electrodes facing a direction away from the trunk portions, the branch electrodes or extension lines of the branch electrodes forming included angles with the first trunk portion, and the included angles being acute angles, wherein the array substrate includes at least one first pixel, and in a first pixel electrode to which the first pixel corresponds, an included angle between at least one branch electrode and the first trunk portion is not equal to included angles between the other branch electrodes and the first trunk portion.

In the array substrate provided in the present disclosure, within the same display domain, the included angles between all the branch electrodes and the first trunk portion are not completely equal.

In the array substrate provided in the present disclosure, within the same display domain, the included angles between all the branch electrodes and the first trunk portion are not completely equal.

In the array substrate provided in the present disclosure, within the same display domain, the included angles between the branch electrodes and the first trunk portion are gradually increased or decreased in a direction away from the first trunk portion.

In the array substrate provided in the present disclosure, the branch electrodes form a plurality of branch units arranged in sequence within the same display domain, each of the branch units includes at least one branch electrode, the included angles between all the branch electrodes and the first trunk portion are equal, and the included angles between the branch units and the first trunk portion are gradually increased or decreased with a predetermined angle difference.

In the array substrate provided in the present disclosure, within the same pixel electrode, the included angles between the branch electrodes and the first trunk portion are gradually increased or decreased in a direction away from the first trunk portion in the two display domains whose positions are symmetrical with respect to the first trunk portion or the second trunk portion.

In the array substrate provided in the present disclosure, in the same pixel electrode, in the two display domains whose positions are symmetrical with respect to the first trunk portion or the second trunk portion, wherein the included angles between the branch electrodes and the first trunk portion within a display domain are gradually increased in a direction away from the first trunk portion, and the included angles between the branch electrodes and the first trunk portion within the other display domain are gradually decreased in a direction away from the first trunk portion.

In the array substrate provided in the present disclosure, within the same display domain, the included angles between all the branch electrodes and the first trunk portion are equal.

In the array substrate provided in the present disclosure, wherein the four display domains include a first group of display domains and a second group of display domains, the first group of display domains includes two display domains whose positions are centrally symmetrical with respect to an intersection of the first trunk portion and the second trunk portion, the second group of display domains includes the other two display domains whose positions are centrally symmetrical with respect to an intersection of the first trunk portion and the second trunk portion, within the first group of display domains, all the branch electrodes and the first trunk portion form first included angles which are equal, within the second group of display domains, all the branch electrodes and the first trunk portion form second included angles which are equal, and the first included angles are not equal to the second included angles.

In the array substrate provided in the present disclosure, wherein the four display domains include a first group of display domains and a second group of display domains, the first group of display domains includes two display domains whose positions are symmetrical with respect to the first trunk portion or the second trunk portion, the second group of display domains includes the other two display domains whose positions are symmetrical with respect to the first trunk portion or the second trunk portion, within the first group of display domains, all the branch electrodes and the first trunk portion form first included angles which are equal, within the second group of display domains, all the branch electrodes and the first trunk portion form second included angles which are equal, and the first included angles are not equal to the second included angles.

In the array substrate provided in the present disclosure, wherein all the pixels on the array substrate are the first pixels.

The present disclosure further provides a liquid crystal display panel, including: an array substrate and a color filter substrate arranged oppositely, the array substrate comprising a plurality of pixels arranged in an array, each pixel including at least three sub-pixels with different emission colors, pixel electrodes to which the sub-pixels correspond including trunk portions and branch portions, the trunk portions including a first trunk portion and a second trunk portion being perpendicular to each other, the first trunk portion and the second trunk portion dividing each of the pixel electrodes into four display domains, the branch portions including a plurality of branch electrodes arranged at intervals within each of the display domains, one end of each of the branch electrodes being diagonally connected to the trunk portions, the other end of each of the branch electrodes facing a direction away from the trunk portions, the branch electrodes or extension lines of the branch electrodes forming included angles with the first trunk portion, and the included angles being acute angles, wherein the array substrate includes at least one first pixel, and in a first pixel electrode to which the first pixel corresponds, an included angle between at least one branch electrode and the first trunk portion is not equal to included angles between the other branch electrodes and the first trunk portion.

In the liquid crystal display panel provided in the present disclosure, within the same display domain, the included angles between all the branch electrodes and the first trunk portion are not completely equal.

In the liquid crystal display panel provided in the present disclosure, within the same display domain, the included angles between the branch electrodes and the first trunk portion are gradually increased or decreased in a direction away from the first trunk portion.

In the liquid crystal display panel provided in the present disclosure, the branch electrodes form a plurality of branch units arranged in sequence within the same display domain, each of the branch units includes at least one branch electrode, the included angles between all the branch electrodes and the first trunk portion are equal, and the included angles between the branch units and the first trunk portion are gradually increased or decreased with a predetermined angle difference.

In the liquid crystal display panel provided in the present disclosure, within the same pixel electrode, the included angles between the branch electrodes and the first trunk portion are gradually increased or decreased in a direction away from the first trunk portion in the two display domains whose positions are symmetrical with respect to the first trunk portion or the second trunk portion.

In the liquid crystal display panel provided in the present disclosure, in the same pixel electrode, in the two display domains whose positions are symmetrical with respect to the first trunk portion or the second trunk portion, wherein the included angles between the branch electrodes and the first trunk portion within a display domain are gradually increased in a direction away from the first trunk portion, and the included angles between the branch electrodes and the first trunk portion within the other display domain are gradually decreased in a direction away from the first trunk portion.

In the liquid crystal display panel provided in the present disclosure, within the same display domain, the included angles between all the branch electrodes and the first trunk portion are equal.

In the liquid crystal display panel provided in the present disclosure, the four display domains include a first group of display domains and a second group of display domains, the first group of display domains includes two display domains whose positions are centrally symmetrical with respect to an intersection of the first trunk portion and the second trunk portion, the second group of display domains includes the other two display domains whose positions are centrally symmetrical with respect to an intersection of the first trunk portion and the second trunk portion, within the first group of display domains, all the branch electrodes and the first trunk portion form first included angles which are equal, within the second group of display domains, all the branch electrodes and the first trunk portion form second included angles which are equal, and the first included angles are not equal to the second included angles.

In the liquid crystal display panel provided in the present disclosure, the four display domains include a first group of display domains and a second group of display domains, the first group of display domains includes two display domains whose positions are symmetrical with respect to the first trunk portion or the second trunk portion, the second group of display domains includes the other two display domains whose positions are symmetrical with respect to the first trunk portion or the second trunk portion, within the first group of display domains, all the branch electrodes and the first trunk portion form first included angles which are equal, within the second group of display domains, all the branch electrodes and the first trunk portion form second included angles which are equal, and the first included angles are not equal to the second included angles.

In the liquid crystal display panel provided in the present disclosure, all the pixels on the array substrate are the first pixels.

Beneficial Effect

The present disclosure provides an array substrate and a liquid crystal display panel. The array substrate includes a plurality of pixels arranged in an array, and each pixel includes at least three sub-pixels with different emission colors. Pixel electrodes to which the sub-pixels correspond include trunk portions and branch portions. The trunk portions include a first trunk portion and a second trunk portion being perpendicular to each other. The first trunk portion and the second trunk portion divide each of the pixel electrodes into four display domains. The branch portions include a plurality of branch electrodes arranged at intervals within each of the display domains. One end of each of the branch electrodes is diagonally connected to the trunk portions, and the other end of each of the branch electrodes faces a direction away from the trunk portions. The branch electrodes or extension lines of the branch electrodes form included angles with the first trunk portion, and the included angles are acute angles. Wherein the array substrate includes at least one first pixel, and in a first pixel electrode to which the first pixel corresponds, an included angle between at least one branch electrode and the first trunk portion is not equal to included angles between the other branch electrodes and the first trunk portion. In the array substrate of the present disclosure, by arranging the included angles between the branch electrodes and the first trunk portion to be not completely equal in the pixel electrode to which at least one pixel corresponds, the brightness complementation of the pixel electrodes at different viewing angles is realized, achieving brightness evenness of the pixel electrodes at different viewing angles, thereby alleviating the problem of narrow viewing angles of the liquid crystal display panel.

BRIEF DESCRIPTION OF THE SEVERAL VIEWS OF THE DRAWINGS

In order to clearly illustrate the embodiments of the present disclosure or the technical solution in the prior art, accompanying drawings for describing the embodiments or the prior art are simply introduced in the following content. Apparently, the accompanying drawings described below are only some embodiments of the present disclosure. A person of ordinary skill in the art, without creative efforts, can derive other drawings from these drawings.

DESCRIPTION OF SPECIFIC EMBODIMENTS OF THE INVENTION

The following description of the embodiments with reference to the accompanying drawings is used to illustrate particular embodiments of the present disclosure. The directional terms referred in the present disclosure, such as "upper", "lower", "front", "back", "left", "right", "inner", "outer", "side surface", etc. are only directions with regard to the accompanying drawings. Therefore, the directional terms used for describing and illustrating the present disclosure are not intended to limit the present disclosure. In the drawings, structurally similar elements are denoted by the same reference numerals.

An embodiment of the present disclosure provides an array substrate and a liquid crystal display panel to alleviate a technical problem of narrow viewing angles of a conventional liquid crystal display panel.

The present disclosure provides an array substrate and a liquid crystal display panel. The array substrate includes a plurality of pixels arranged in an array, and each pixel includes at least three sub-pixels with different emission colors. Pixel electrodes to which the sub-pixels correspond include trunk portions and branch portions. The trunk portions include a first trunk portion and a second trunk portion being perpendicular to each other. The first trunk portion and the second trunk portion divide each of the pixel electrodes into four display domains. The branch portions include a plurality of branch electrodes arranged at intervals within each of the display domains. One end of each of the branch electrodes is diagonally connected to the trunk portions, and the other end of each of the branch electrodes faces a direction away from the trunk portions. The branch electrodes or extension lines of the branch electrodes form included angles with the first trunk portion, and the included angles are acute angles. Wherein the array substrate includes at least one first pixel, and in a first pixel electrode to which the first pixel corresponds, an included angle between at least one branch electrode and the first trunk portion is not equal to included angles between the other branch electrodes and the first trunk portion.

Figure 1:
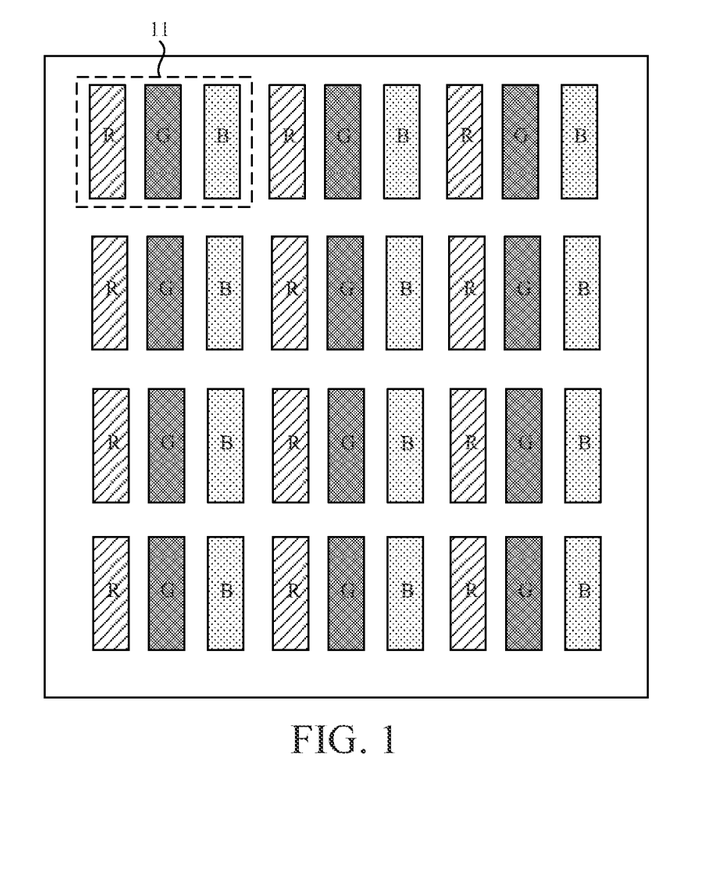
FIG. 1 is a schematic plan view of an array substrate provided by an embodiment of the present disclosure.
Figure 2:
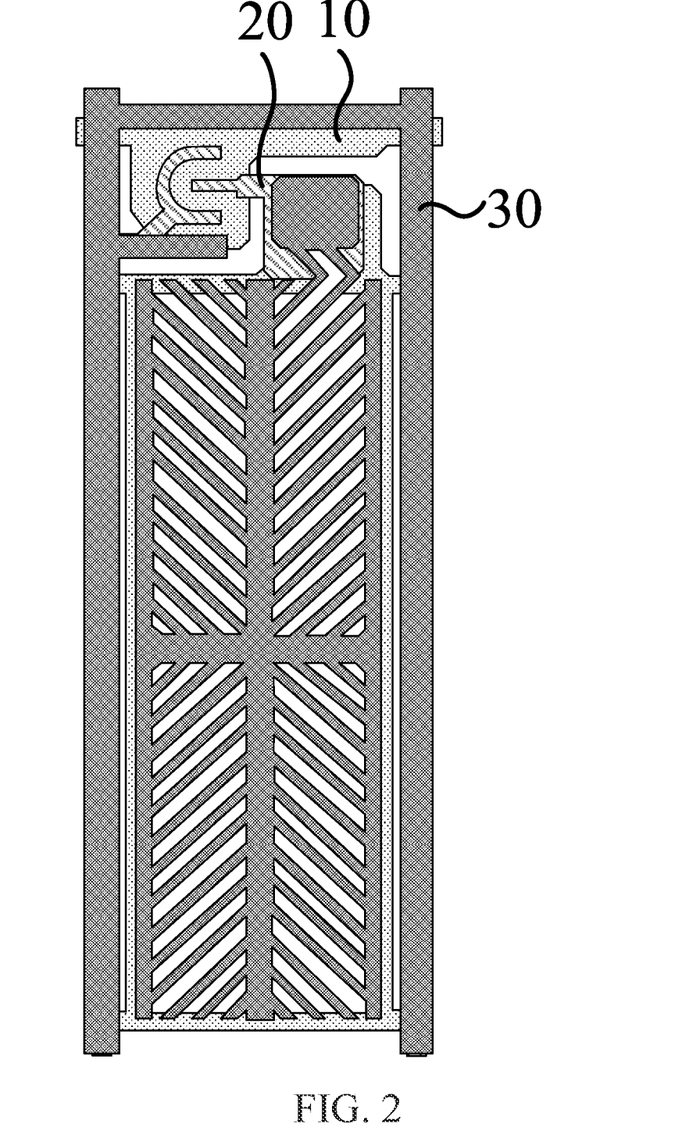
FIG. 2 is a schematic diagram of a layer stack of one sub-pixel in a first pixel in an array substrate provided by an embodiment of the present disclosure.
Figure 3:
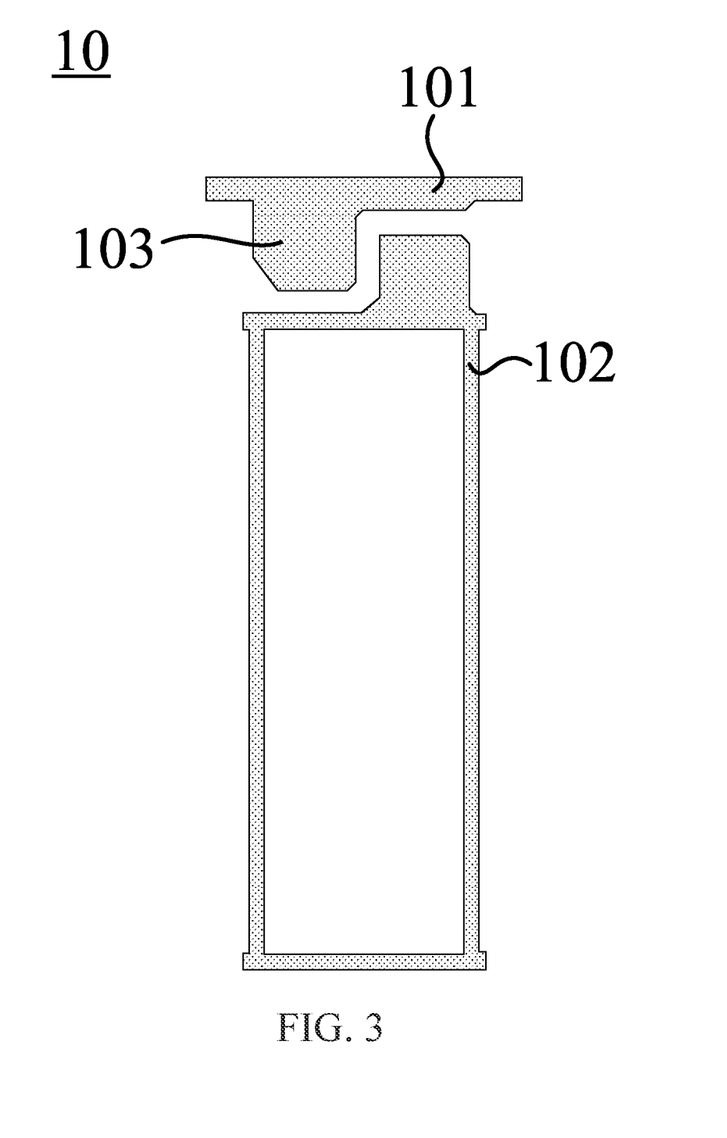
FIG. 3 is a schematic plan view of a first metal layer in the sub-pixel of FIG. 1.
Figure 4:
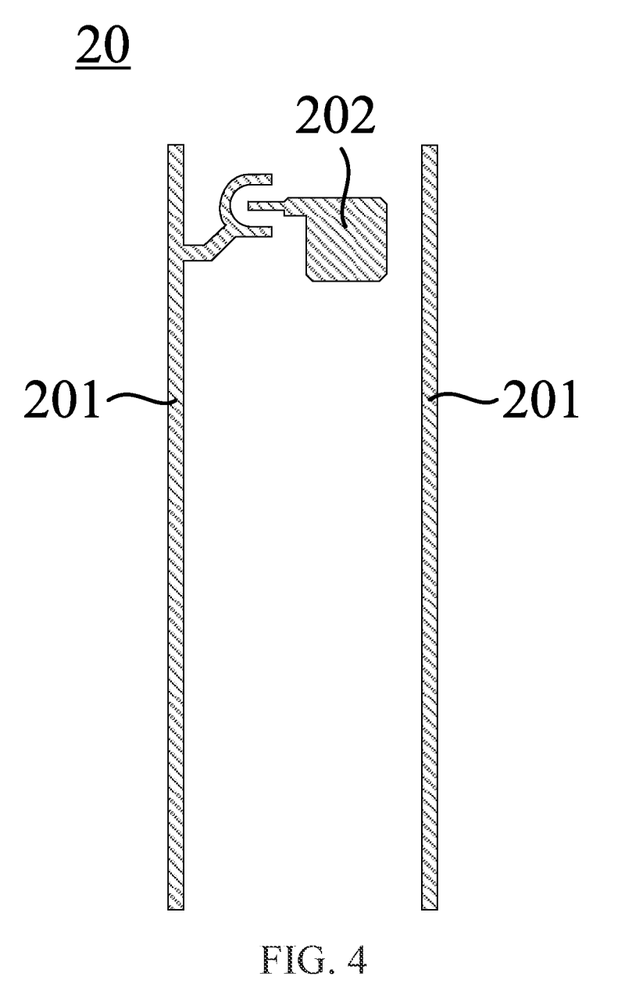
FIG. 4 is a schematic plan view of source and drain layers in the sub-pixel of FIG. 1.
Figure 5:
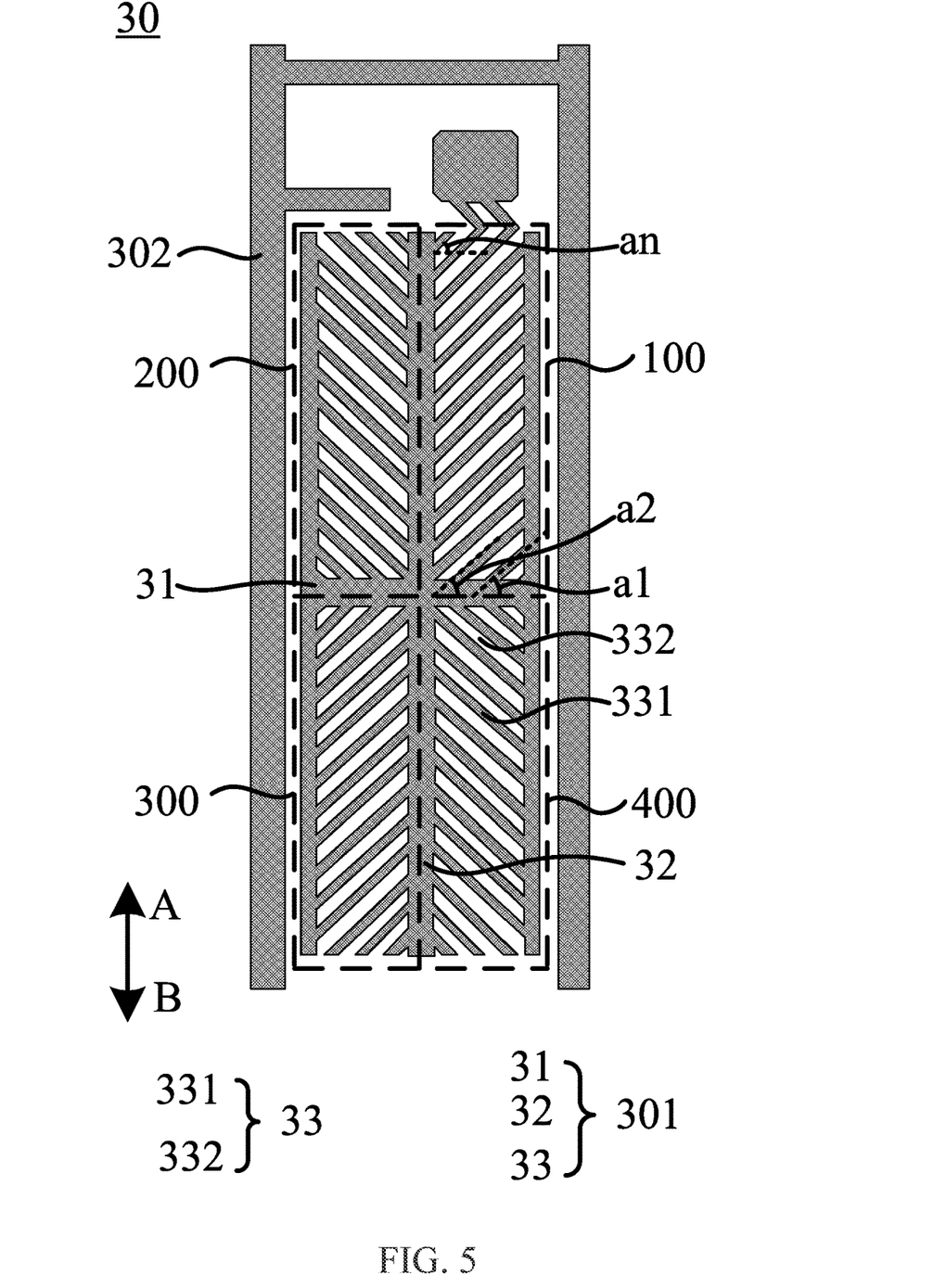
FIG. 5 is a schematic diagram of a first planar structure of a pixel electrode layer in the sub-pixel of FIG. 1.

As shown in FIG. 1, the array substrate of the present disclosure includes a plurality of pixels 11 arranged in an array, and each pixel 11 includes at least three sub-pixels with different emission colors. Taking a pixel including three sub-pixels as an example, a pixel includes a red sub-pixel R, a green sub-pixel G and a blue sub-pixel B. The array substrate includes at least one first pixel. In the first pixel electrode to which the first pixel corresponds, an angle formed between at least one branch electrode and the first trunk portion is not equal to angles formed between the other branch electrodes and the first trunk portion. As shown in FIG. 2, it is a schematic diagram of layer stack of one of the sub-pixels in the first pixel of the array substrate provided in an embodiment of the present disclosure. The figure shows a stacking effect of each layer in the sub-pixel, including a first metal layer 10, a source-drain layer 20, and a pixel electrode layer 30 stacked. FIG. 3 to FIG. 5 are schematic plan views of each layer in the sub-pixels in FIG. 2, respectively. The array substrate is described below with reference to FIG. 2 to FIG. 5.

Corresponding to each sub-pixel in the first pixel, the array substrate includes a substrate, a buffer layer, an active layer, a first gate insulating layer, a first metal layer 10, a second gate insulating layer, a second metal layer, an interlayer dielectric layer, an source-drain layer 20, a planarization layer and a pixel electrode layer 30 stacked in sequence from bottom to top.

The first metal layer 10 is formed on the first gate insulating layer. Material of the first metal layer 10 may be molybdenum, aluminum, copper, but is not limited thereto. It may also be chromium, tungsten, titanium, tantalum and alloys containing them, and the material thereof is not specifically limited herein. As shown in FIG. 3, the first metal layer 10 is patterned by an etching process to form scan lines 101, a shield electrode 20, a gate electrode 103 of each thin film transistor, and a first plate of a storage capacitor (not shown), wherein the gates of each sub-pixel in the same row of pixels are connected with the same scan lines 101.

The source-drain layer 20 is formed on the interlayer dielectric layer. Material of the source-drain layer 20 may be molybdenum, aluminum, copper, but is not limited thereto. It may also be chromium, tungsten, titanium, tantalum, and alloys containing them. As shown in FIG. 4, the source-drain layer 20 is patterned by an etching process to form data lines 201, and the source and drain 202 of each thin-film transistor, wherein the drain of each thin-film transistor in the same column of sub-pixels is connected with the left and right columns of data lines 201 of the column of sub-pixels.

The pixel electrode layer 30 is formed on the planarization layer, and is connected to the source-drain layer 20 by via holes. As shown in FIG. 5, the pixel electrode layer 30 is patterned to form a pixel electrode 301 and a common electrode line 302.

In the present disclosure, the array substrate includes a plurality of data lines 201 which are distributed at intervals along a vertical direction, and also includes a plurality of scan lines 101 which are distributed at intervals along a horizontal direction. The data lines 201 and the scan lines 101 are arranged across and perpendicularly. The plurality of pixels in the array substrate are distributed in an array. When each sub-pixel needs to display images, the scan lines 101 scan line by line, controls each pixel to turn on line by line, and inputs signals by the data lines 201 such that each column of pixels emit light for display.

As shown in FIG. 5, the pixel electrode 301 to which the sub-pixel corresponds includes trunk portions and branch portions 33. The trunk portions include a first trunk portion 31 and a second trunk portion 32 that are perpendicular to each other, wherein the first trunk portion 31 is parallel to the scan lines 101, and the second stem portion 32 is parallel to the data lines 201. The first trunk portion 31 and the second trunk portion 32 divide the pixel electrode 30 into four display domains. In FIG. 5, the four display domains sequentially include a first display domain 100 in the first quadrant, the second display domain 200 in the second quadrant, the third display domain 300 in the third quadrant, and the fourth display domain 400 in the fourth quadrant. In each display domain, the branch portions 33 include a plurality of branch electrodes 331 arranged at intervals. Each of the branch electrodes 331 is not in contact with one another, and a slit 332 is formed between two adjacent branch electrodes 331. One end of each of the branch electrodes 331 is diagonally connected to the trunk portions, and the other end of each of the branch electrodes faces in a direction away from the trunk portions.

Since each of the branch electrodes 331 is diagonally connected to the trunk portions, each of the branch electrodes 331 or the extension lines of the branch electrodes 331 form included angles with the first trunk portion 31. The included angles are acute angles. In the array substrate of the present disclosure, in the first pixel electrodes to which the first pixel corresponds, an included angle formed between at least one branch electrode 331 and the first trunk portion 31 is not equal to the included angles formed between the other branch electrodes and the first trunk portion 31. Therefore, in the same pixel electrode, the branch electrodes 331 forming unequal included angles can provide inclined electric fields with different included angles and induce the liquid crystal molecules to incline in different directions after being electrified. Thus, the brightness complementation at different viewing angles achieves brightness evenness of the pixel electrode at different viewing angles, such that the viewing angles of the liquid crystal display panel are enlarged, thereby alleviating the problem of narrow viewing angles of the liquid crystal display panel.

The position of the first pixel on the array substrate may be disposed by demand. Some pixels may be arranged as the first pixels, or all pixels may be arranged as the first pixels. When the positions of some pixels are the first pixels, the other pixels on the array substrate are the second pixels. In the second pixel electrodes to which the second pixel corresponds, the included angles between all the branch electrodes and the first trunk portion are equal. When all pixels in the array substrate are the first pixels, an included angle formed between at least one branch electrode 331 and the first trunk portion 31 in each of the pixel electrodes is not equal to included angles between the other branch electrodes and the first trunk portion 31. At this time, the effect of brightness complementation is the best, and the effect of raising the viewing angles is the largest.

In the first pixel electrode to which the first pixel corresponds, the included angle formed by the at least one branch electrode 331 and the first trunk portion 31 is not equal to the included angles formed between the other branch electrodes and the first trunk portion 31. There may be a variety of arrangements.

In one embodiment, within the same display domain, the included angles between all the branch electrodes 331 and the first trunk portion 31 are not completely equal. As shown in FIG. 5, taking the first display domain 100 as an example, in the direction A away from the first trunk portion 31, the included angles between the branch electrodes 331 and the first trunk portion 31 are a1, a2, . . . , an in sequence, wherein the angles of a1, a2, . . . , an are not completely equal.

In one embodiment, within the same display domain, the included angles between the branch electrode 331 and the first trunk portion 31 are gradually increased or decreased in the direction away from the first trunk portion 31. Taking FIG. 5 as an example, the angles from a1 to an in the first display domain 100 are gradually increased or decreased. That is, the angles of the included angles are gradually changed. The angle difference between two adjacent included angles can be an arbitrary value. The minimum value is 40 degrees, and the maximum value is 45 degrees among a1 and an. In this way, the same display domain is divided into several different areas. The brightness evenness at different viewing angles is achieved using brightness complementation of each area at different viewing angles, thereby solving the problem of existing narrow viewing angles in the conventional 4-domain design.

In one embodiment, within the same display domain, the branch electrodes 331 form a plurality of branch units arranged in sequence. Each of the branch units includes at least one branch electrode 331. The included angles between all the branch electrodes 331 in each of the branch units and the trunk portion 31 are equal. In a direction away from the first trunk portion 31, the included angles between the branch units and the first trunk portion 331 are gradually increased or decreased with a predetermined angle difference.

Figure 6:
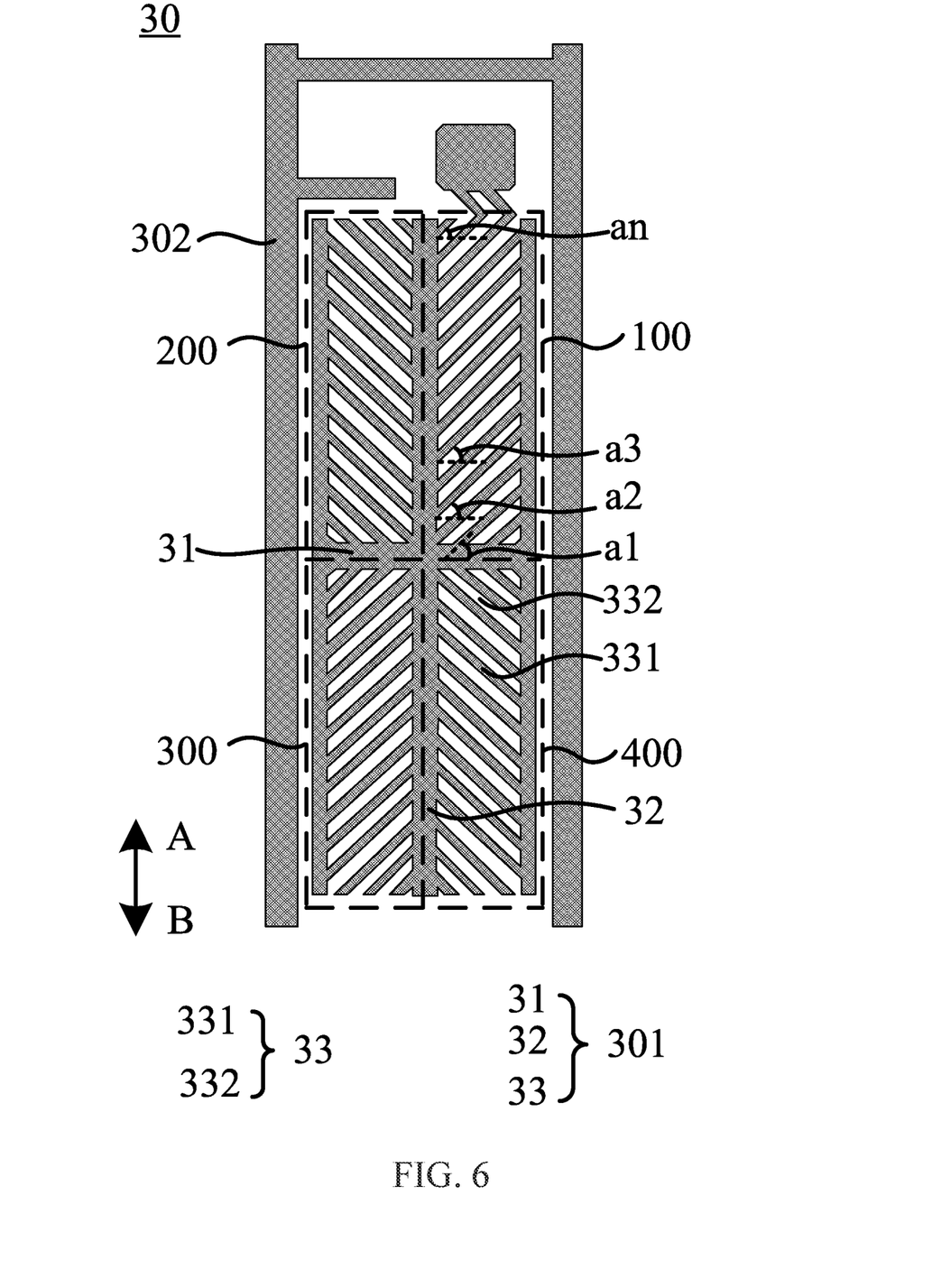
FIG. 6 is a schematic diagram of a second planar structure of the pixel electrode layer in the sub-pixel of FIG. 1.

As shown in FIG. 6, taking each of the branch units including two branch electrodes 331 as an example, in the direction A away from the first trunk portion 31, the included angle which the first branch electrode 331 and the second branch electrode 331 form with the first trunk portion 31 is a1, the included angle which the third branch electrode 331 and the fourth branch electrode 331 form with the first trunk portion 31 is a2, and so on. The included angles which the n−1th branch electrode 331 and the nth branch electrode 331 form with the first trunk portion 31 are an. a1, a2, . . . , an are gradually increased or decreased with a predetermined angle difference, and the predetermined angle may be 1 degree or other values. Of course, each of the branch units may further include more branch electrodes 331, and the number of the branch electrodes 331 in each of the branch units may be equal or unequal.

The minimum value is 40 degrees, and the maximum value is 45 degrees among a1 and an. In one embodiment, in an array substrate of an 8K liquid crystal display panel, the first pixel electrode to which the first pixel corresponds within each display domain, the value of n is 6, and the predetermined angle is 1 degree when a1, a2, . . . , an are gradually increased or decreased with the predetermined angle difference. That is, the display domain includes 12 branch electrodes 331. In a direction away from the first trunk portion 31, the included angle a1 between the first and second branch electrodes and the first trunk portion 31 is 40 degrees, the included angle a2 between the third and fourth branch electrodes and the first trunk 31 is 41 degrees, the included angle a3 between the fifth and sixth branch electrodes and the first trunk portion 31 is 42 degrees, the included angle a4 between the seventh and eighth branch electrodes and the first trunk portion 31 is 43 degrees, the included angle a5 between the ninth and tenth branch electrodes and the first trunk portion 31 is 44 degrees, and the included angle a6 between the eleventh and twelfth branch electrodes and the first trunk portion 31 is 45 degrees.

In addition, within the same display domain, the included angles between each of the branch electrode 331 and the first trunk portion 31 may also be a random arrangement of arbitrary angles between 40 degrees and 45 degrees. In this way, the same display domain is divided into several different areas. The brightness evenness at different viewing angles is achieved using brightness complementation of each area at different viewing angles, thereby solving the problem of existing narrow viewing angles in the conventional 4-domain design.

The above embodiment describes the relationship of the included angles between each of the branch electrode 331 and the first trunk portion 31 within the same display domain. The four display domains are included in a pixel electrode, and there are a variety of cases for the relationship of the included angles between the branch portions and the first trunk portion within different display domains.

In one embodiment, in the same pixel electrode, in the two display domains whose positions are symmetrical with respect to the first trunk portion 31 or the second trunk portion 32, the included angles between the branch electrodes 331 and the first trunk portion 31 are gradually increased or decreased in a direction away from the first trunk portion 31.

Taking FIG. 5 or FIG. 6 as an example, in one embodiment, the positions of the first display domain 100 and the second display domain 200 are symmetrical with respect to the second trunk portion 32, and the positions of the third display domain 300 and the fourth display domain 400 are symmetrical with respect to the second trunk portion 32. The included angles between the branch electrodes 331 and the first trunk portion 31 in the first display domain 100 are a1, a2, . . . , an in sequence in the direction A away from the first trunk portion 31, and the included angles between the branch electrodes 331 and the first trunk portion 31 in the second display domain 200 are also a1, a2, . . . , an in sequence in the direction A away from the first trunk portion 31, where a1, a2, . . . , an are gradually increased or decreased. The included angles between the branch electrodes 331 and the first trunk portion 31 in the third display domain 300 is a1, a2, . . . , an in sequence in the direction B away from the first trunk portion 31, and the included angles between the branch electrode 331 and the first trunk portion 31 in the fourth display domain 400 are also a1, a2, . . . , an in sequence in the direction B away from the first trunk portion 31, where a1, a2, . . . , an all gradually increased or decreased. It should be noted that a1, a2, . . . , an represent the arrangement order of the included angles. Within different display domains, the values of the two a1 may be equal or unequal.

In another embodiment, the positions of the first display domain 100 and the fourth display domain 400 are symmetrical with respect to the first trunk portion 31, and the positions of the second display domain 200 and the third display domain 300 are symmetrical with respect to the first trunk portion 31. At this time, the included angles between the branch electrodes 331 and the first trunk portion 31 in the first display domain 100 are a1, a2, . . . , an in sequence in the direction A away from the first trunk portion 31, and the included angles between the branch electrodes 331 and the first trunk portion 31 in the fourth display domain 400 are also a1, a2, . . . , an in sequence in the direction B away from the first trunk portion 31, where a1, a2, . . . , an are gradually increased or decreased. The included angles between the branch electrodes 331 and the first trunk portion 31 in the second display domain 200 are a1, a2, . . . , an in sequence in the direction A away from the first trunk portion 31, and the included angles between the branch electrodes 331 and the first trunk portion 31 in the third display domain 300 are also a1, a2, . . . , an in sequence in the direction B away from the first trunk portion 31, where a1, a2, . . . , an are gradually increased or decreased. Similarly, a1, a2, . . . , an represent the arrangement order of the included angles. Within different display domains, the values of the two a1 may be equal or unequal.

In one embodiment, in the same pixel electrode, in the two display domains whose positions are symmetrical with respect to the first trunk portion 31 or the second trunk portion 32, wherein the included angles between the branch electrodes 331 and the first trunk portion 31 within a display domain are gradually increased in a direction away from the first trunk portion, and the included angles between the branch electrodes 331 and the first trunk portion 31 within the other display domain are gradually decreased in a direction away from the first trunk portion.

Taking FIG. 5 or FIG. 6 as an example, in one embodiment, the positions of the first display domain 100 and the second display domain 200 are symmetrical with respect to the second trunk portion 32, and the positions of the third display domain 300 and the fourth display domain 400 are symmetrical with respect to the second trunk portion 32. The included angles between the branch electrodes 331 and the first trunk portion 31 in the first display domain 100 are a1, a2, . . . , an in sequence in the direction A away from the first trunk portion 31, and the included angles between the branch electrodes 331 and the first trunk portion 31 in the second display domain 200 are an, an−1, . . . , a1 in sequence in the direction A away from the first trunk portion 31, wherein when a1, a2, . . . , an are gradually increased, an, an−1, . . . , a1 are gradually decreased, and when a1, a2, . . . , an are gradually decreased, an, an−1, . . . , a1 are gradually increased. The included angles between the branch electrodes 331 and the first trunk portion 31 in the third display domain 300 are a1, a2, . . . , an in sequence in the direction B away from the first trunk portion 31, and the included angles between the branch electrodes 331 and the first trunk portion 31 in the fourth display domain 400 are an, an−1, . . . , a1 in sequence in the direction B away from the first trunk portion 31, when a1, a2, . . . , an are gradually increased, an, an−1, . . . , a1 are gradually decreased, and when a1, a2, . . . , an are gradually decreased, an, an−1, . . . , a1 are gradually increased. It should be noted that a1, a2, . . . , an represent the arrangement order of the included angles. Within different display domains, the values of the two a1 may be equal or unequal.

In another embodiment, the positions of the first display domain 100 and the fourth display domain 400 are symmetrical with respect to the first trunk portion 31, and the positions of the second display domain 200 and the third display domain 300 are symmetrical with respect to the first trunk portion 31, At this time, the included angles between the branch electrodes 331 and the first trunk portion 31 in the first display domain 100 are a1, a2, . . . , an in sequence in the direction A away from the first trunk portion 31, and the included angles between the branch electrodes 331 and the first trunk portion 31 in the fourth display domain 400 are an, an−1, . . . , a1 in sequence in the direction B away from the first trunk portion 31, wherein when a1, a2, . . . , an are gradually increased, an, an−1, . . . , a1 are gradually decreased, and when a1, a2, . . . , an are gradually decreased, an, an−1, . . . , a1 are gradually increased. The included angles between the branch electrodes 331 and the first trunk portion 31 in the second display domain 200 are a1, a2, . . . , an in sequence in the direction A away from the first trunk portion 31, and the included angles between the branch electrodes 331 and the first trunk portion 31 in the third display domain 300 are an, an−1, . . . , a1 in sequence in the direction B away from the first trunk portion 31, wherein when a1, a2, . . . , an are gradually increased, an, an−1, . . . , a1 are gradually decreased, and when a1, a2, . . . , an are gradually decreased, an, an−1, . . . , a1 are gradually increased. Similarly, a1, a2, . . . , an represent the arrangement order of the included angles. Within different display domains, the values of the two a1 may be equal or unequal.

By the above design, within different display domains of the same pixel electrode, the design in which the included angles between the branch electrodes 331 and the first stem portion 31 are not completely equal is achieved, such that the same display domain is divided into several different areas. The brightness evenness at different viewing angles is achieved using brightness complementation of each area at different viewing angles, thereby solving the problem of existing narrow viewing angles in the conventional 4-domain design.

In one embodiment, within the same display domain, the included angles between all the branch electrodes and the first trunk portion are equal. At this time, there are also a variety of cases for the relationship of the included angles between the branch portions and the first trunk portion within different display domains.

In one embodiment, the four display domains include a first group of display domains and a second group of display domains. The first group of display domains includes two display domains whose positions are centrally symmetrical with respect to an intersection of the first trunk portion and the second trunk portion. The second group of display domains includes the other two display domains whose positions are centrally symmetrical with respect to the intersection of the first trunk portion and the second trunk portion. Within the first group of display domains, all the branch electrodes and the first trunk portion form first included angles which are equal. Within the second group of display domains, all the branch electrodes and the first trunk portion form second included angles which are equal. The first included angles are not equal to the second included angles.

Figure 7:
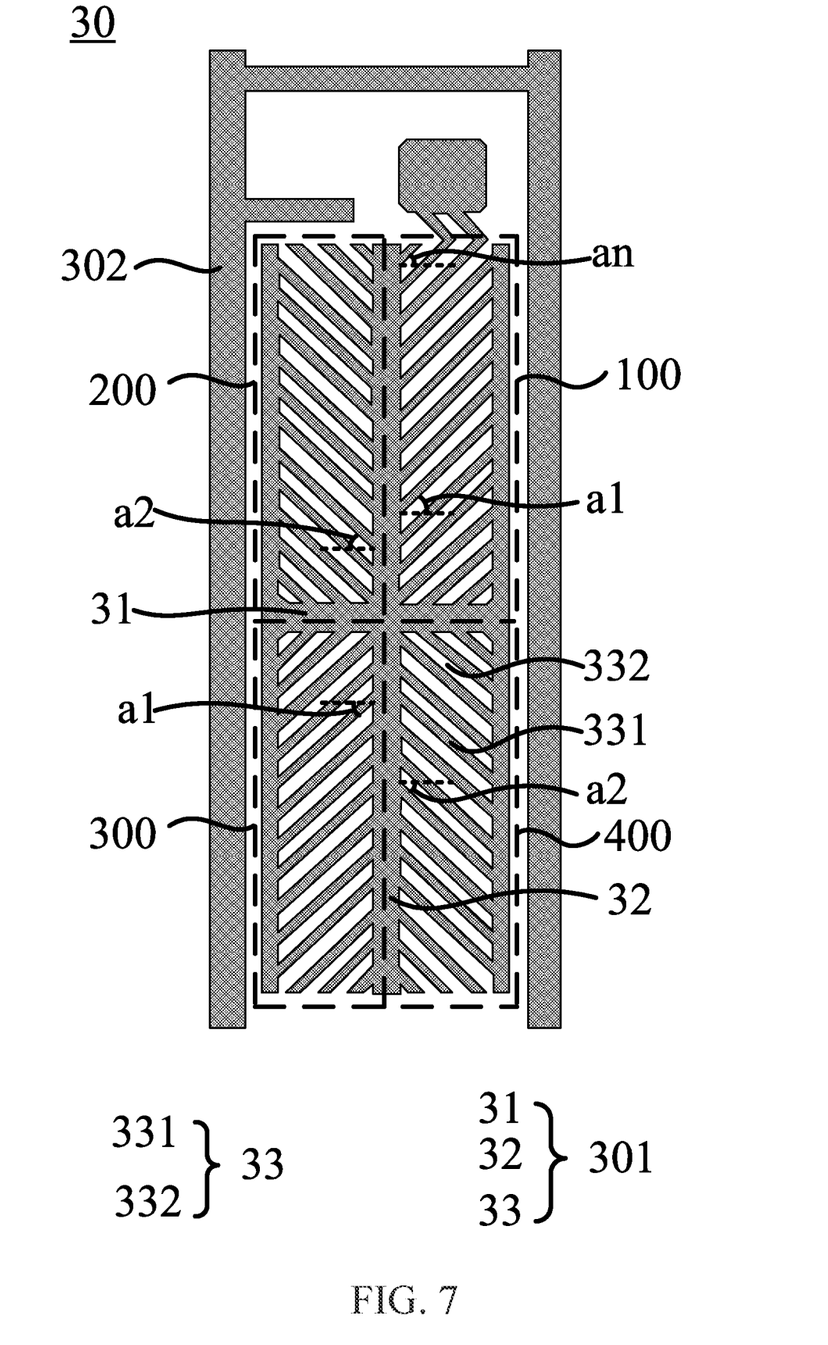
FIG. 7 is a schematic diagram of a third planar structure of the pixel electrode layer in the sub-pixel of FIG. 1.

As shown in FIG. 7, all the branch electrodes 331 and the first trunk portion 31 in the first group of display domains form the first angles a1 which are equal, and all the branch electrodes 331 and the first trunk portion 31 in the second group of display domains form the second angles a2 which are equal when the first display domain 100 and the third display domain 300 are the first group of display domains, and the second display domain 200 and the fourth display domain 400 are the second group of display domains, where a1 is not equal to a2. Wherein a1 can be 40 degrees and a2 can be 45 degrees, or a1 is 45 degrees and a2 is 40 degrees. At this time, the pixel electrode of a sub-pixel is divided into several different areas. The brightness evenness at different viewing angles is achieved using brightness complementation of each area at different viewing angles, thereby solving the problem of existing narrow viewing angles in the conventional 4-domain design.

In one embodiment, the four display domains include a first group of display domains and a second group of display domains. The first display domain includes two display domains whose positions are symmetrical with respect to the first trunk portion or the second trunk portion. The second group of display domains includes the other two display domains whose positions are symmetrical with respect to the first trunk portion or the second trunk portion. In the first group of display domains, all the branch electrodes and the first trunk portion form first included angles which are equal. In the second group of display domains, all the branch electrodes and the first trunk portion form second included angles which are equal. The first included angles are not equal to the second included angles.

Figure 8:
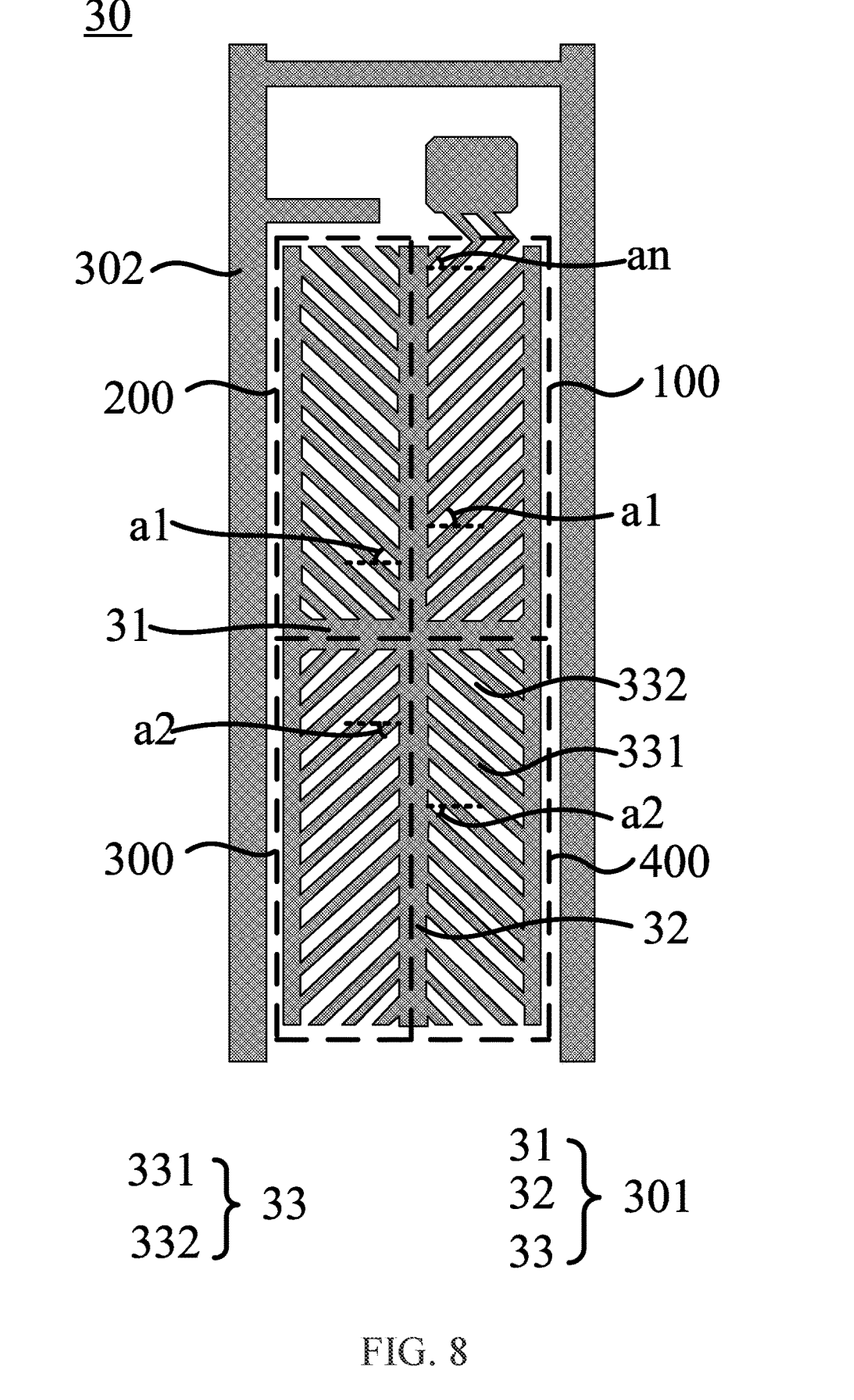
FIG. 8 is a schematic diagram of a fourth planar structure of the pixel electrode layer in the sub-pixel of FIG. 1.
Figure 9:
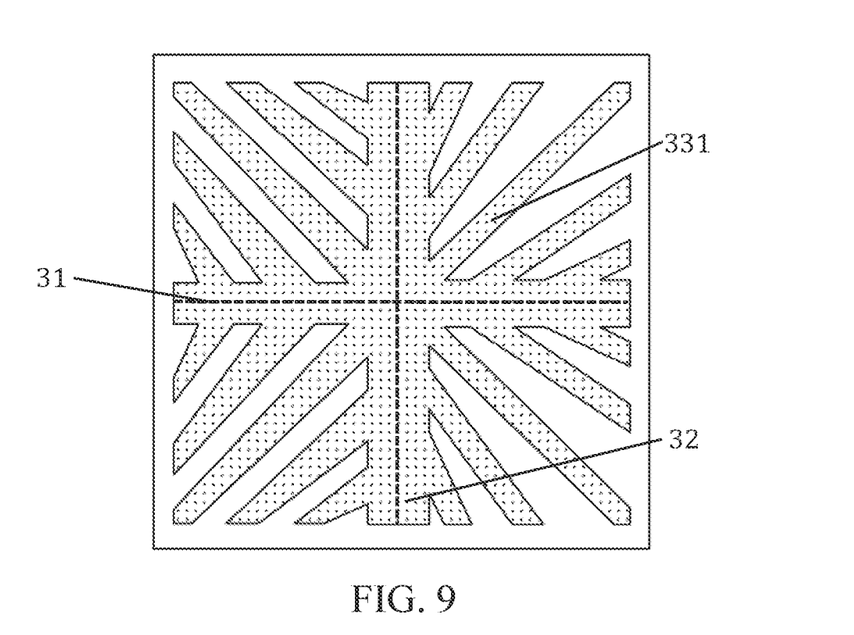
FIG. 9 is a schematic diagram of an example of a planar structure of the pixel electrode layer in the sub-pixel of FIG. 1.
Figure 10:
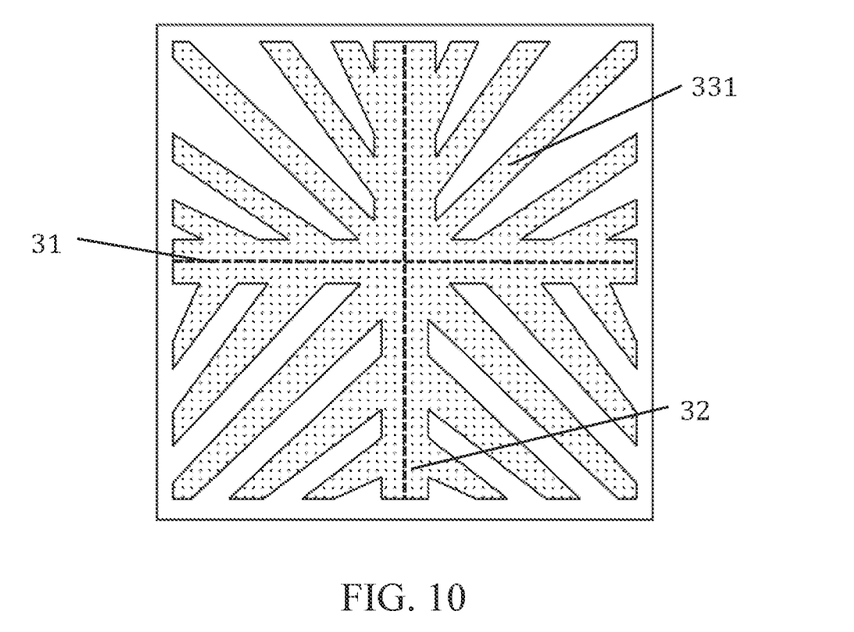
FIG. 10 is a schematic diagram of another example of a planar structure of the pixel electrode layer in the sub-pixel of FIG. 1.

As shown in FIG. 8, all the branch electrodes 331 and the first trunk portion 31 in the first group of display domains form the first angles a1 which are equal, and all the branch electrodes 331 and the first trunk portion 31 in the second group of display domains form the second angles a2 which are equal when the first display domain 100 and the second display domain 200 are the first group of display domains, and the third display domain 300 and the fourth display domain 400 are the second group of display domains, where a1 is not equal to a2. Wherein a1 can be 40 degrees and a2 can be 45 degrees, or a1 is 45 degrees and a2 is 40 degrees. All the branch electrodes 331 and the first trunk portion 31 in the first group of display domains form the first angles a1 which are equal, and all the branch electrodes 331 and the first trunk portion 31 in the second group of display domains form the second angles a2 which are equal when the first display domain 100 and the fourth display domain 400 are the first group of display domains, and the second display domain 200 and the third display domain 300 are the second group of display domains, where a1 is not equal to a2. Wherein a1 can be 40 degrees and a2 can be 45 degrees, or a1 is 45 degrees and a2 is 40 degrees. At this time, the pixel electrode of a sub-pixel is divided into several different areas. The brightness evenness at different viewing angles is achieved using brightness complementation of each area at different viewing angles, thereby solving the problem of existing narrow viewing angles in the conventional 4-domain design.

In the array substrate of the present disclosure, by arranging the included angles between the branch electrodes and the first trunk portion to be not completely equal in the pixel electrode to which at least one pixel corresponds, the brightness complementation of the pixel electrodes at different viewing angles is realized, achieving brightness evenness at different viewing angles, thereby alleviating the problem of narrow viewing angles of the liquid crystal display panel.

The present disclosure also provides a liquid crystal display panel, which includes an array substrate and a color filter substrate that are oppositely arranged. The array substrate is the array substrate described in any one of the foregoing embodiments. In the liquid crystal display panel of the present disclosure, by arranging the included angles between the branch electrodes and the first trunk portion to be not completely equal in the pixel electrode to which at least one pixel corresponds, the brightness complementation of the pixel electrodes at different viewing angles is realized, achieving brightness evenness at different viewing angles, thereby alleviating the problem of narrow viewing angles of the liquid crystal display panel, and getting promoted on viewing angles.

According to the Above Embodiment 5

The present disclosure provides an array substrate and a liquid crystal display panel. The array substrate includes a plurality of pixels arranged in an array, and each pixel includes at least three sub-pixels with different emission colors. Pixel electrodes to which the sub-pixels correspond include trunk portions and branch portions. The trunk portions include a first trunk portion and a second trunk portion being perpendicular to each other. The first trunk portion and the second trunk portion divide each of the pixel electrodes into four display domains. The branch portions include a plurality of branch electrodes arranged at intervals within each of the display domains. One end of each of the branch electrodes is diagonally connected to the trunk portions, and the other end of each of the branch electrodes faces a direction away from the trunk portions. The branch electrodes or extension lines of the branch electrodes form included angles with the first trunk portion, and the included angles are acute angles. Wherein the array substrate includes at least one first pixel, and in a first pixel electrode to which the first pixel corresponds, an included angle between at least one branch electrode and the first trunk portion is not equal to included angles between the other branch electrodes and the first trunk portion. In the array substrate of the present disclosure, by arranging the included angles between the branch electrodes and the first trunk portion to be not completely equal in the pixel electrode to which at least one pixel corresponds, the brightness complementation of the pixel electrodes at different viewing angles is realized, achieving brightness evenness of the pixel electrodes at different viewing angles, thereby alleviating the problem of narrow viewing angles of the liquid crystal display panel.

In the above embodiments, the description of each embodiment has its own emphasis. For a part that is not detailed in an embodiment, the related descriptions of other embodiments can be referred.

An array substrate and a liquid crystal display panel provided by the embodiments of the present disclosure are introduced in detail above. Specific examples are applied to set forth the principles and implementation of the present disclosure herein. The above descriptions of examples are only intended to help the understanding of the technical solution and the idea of the present disclosure. It should be understood that for those skilled in the art: modifications still may be made to the technical solutions described in the foregoing embodiments, or equivalent substitutions may be made to some of the technical features thereof. These modifications or substitutions do not make the essence of the corresponding technical solutions depart from the scope of the technical solutions of the embodiments of the present disclosure.

What is claimed is:

1. An array substrate, comprising:
a plurality of pixels arranged in an array, each pixel including at least three sub-pixels with different emission colors, a pixel electrode to which each of the sub-pixels correspond including a trunk portion and a branch portion, the trunk portion including a first trunk portion and a second trunk portion being perpendicular to each other, the first trunk portion and the second trunk portion dividing the pixel electrode into four display domains, the branch portion including a plurality of branch electrodes arranged at intervals within each of the display domains, one end of each of the branch electrodes being diagonally connected to the trunk portion, an other end of each of the branch electrodes facing a direction away from the trunk portion, each of the branch electrodes or an extension line of each of the branch electrodes forming an included angle with the first trunk portion, and the included angle being an acute angle, wherein the array substrate includes at least one first pixel, a first pixel electrode to which the first pixel corresponds has two display domains whose positions are symmetrical with respect to the first trunk portion or the second trunk portion, an included angle between each of the branch electrodes within one of the two display domains and the first trunk portion is gradually increased in a direction away from the first trunk portion, and an included angle between each of the branch electrodes within an other one of the two display domains and the first trunk portion is gradually decreased in a direction away from the first trunk portion.

2. A liquid crystal display panel, comprising:
an array substrate; and
a color filter substrate arranged opposite to the array substrate,
wherein the array substrate comprises a plurality of pixels arranged in an array, each pixel including at least three sub-pixels with different emission colors, a pixel electrode to which each of the sub-pixels correspond including a trunk portion and a branch portion, the trunk portion including a first trunk portion and a second trunk portion being perpendicular to each other, the first trunk portion and the second trunk portion dividing the pixel electrode into four display domains, the branch portion including a plurality of branch electrodes arranged at intervals within each of the display domains, one end of each of the branch electrodes being diagonally connected to the trunk portion, an other end of each of the branch electrodes facing a direction away from the trunk portion, each of the branch electrodes or an extension line of each of the branch electrodes forming an included angle with the first trunk portion, the included angle being an acute angle; and wherein the array substrate includes at least one first pixel, a first pixel electrode to which the first pixel corresponds has two display domains whose positions are symmetrical with respect to the first trunk portion or the second trunk portion, an included angle between each of the branch electrodes within one of the two display domains and the first trunk portion is gradually increased in a direction away from the first trunk portion, and an included angle between each of the branch electrodes within an other one of the two display domains and the first trunk portion is gradually decreased in a direction away from the first trunk portion.

* * * * *